United States Patent [19]

Sekiya et al.

[11] Patent Number: 4,708,906
[45] Date of Patent: Nov. 24, 1987

[54] MAGNETIC RECORDING MEDIUM COMPRISING AN UNDERCOAT LAYER MADE OF SPECIFIC TYPE OF RESIN COMPOSITION

[75] Inventors: Satoshi Sekiya; Ikuo Matsumoto; Kuniharu Fujiki, all of Mito, Japan

[73] Assignee: Victor Company of Japan, Ltd., Japan

[21] Appl. No.: 724,288

[22] Filed: Apr. 17, 1985

[30] Foreign Application Priority Data

Apr. 18, 1984 [JP] Japan .................................. 59-76703
Apr. 18, 1984 [JP] Japan .................................. 59-76704

[51] Int. Cl.⁴ .............................................. G11B 5/68
[52] U.S. Cl. .................................. 428/336; 427/131; 428/423.1; 428/423.7; 428/694; 428/900
[58] Field of Search ...................... 428/694, 900, 423.1, 428/423.7, 336; 427/131

[56] References Cited

U.S. PATENT DOCUMENTS

| | | | |
|---|---|---|---|
| 4,183,976 | 1/1980 | Yamada et al. | 427/131 |
| 4,197,347 | 4/1980 | Ogawa et al. | 428/339 |
| 4,275,113 | 6/1981 | Saito et al. | 427/131 |
| 4,364,885 | 12/1982 | Kanai et al. | 428/423.7 |
| 4,468,436 | 8/1984 | Okita et al. | 427/131 |

Primary Examiner—Paul J. Thibodeau
Attorney, Agent, or Firm—Lowe, Price, LeBlanc, Becker & Shur

[57] ABSTRACT

A magnetic recording medium comprising a non-magnetic support and a magnetic recording layer formed on the support through an undercoat layer. The undercoat layer is made of a combination of a thermosetting polyurethane resin, carbon black and an ammonium salt of a phosphoric ester of the following formula

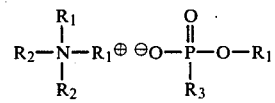

in which each $R_1$, each $R_2$ and $R_3$ independently represent an alkyl group having from 1 to 18 carbon atoms, alkoxy group having from 1 to 4 carbon atoms, an or phenyl group. Preferably, in the formula, each $R_1$ represents $CH_3$, each $R_2$ represents an alkyl group having from 1 to 14 carbon atoms, and $R_3$ represents $-OCH_3$ or a phenyl radical. The undercoat layer may further comprise a thermosetting polyester resin so as to improve adhesiveness.

10 Claims, No Drawings

MAGNETIC RECORDING MEDIUM COMPRISING AN UNDERCOAT LAYER MADE OF SPECIFIC TYPE OF RESIN COMPOSITION

BACKGROUND OF THE INVENTION

1. Field of the Invention

This invention relates to magnetic recording mediums of the type which comprise a magnetic recording layer on a non-magnetic substrate.

2. Description of the Prior Art

The magnetic recording medium of the type mentioned above is ordinarily made by applying a magnetic paint comprising magnetic powder and a binder, to a non-magnetic support and drying the applied paint.

In recent years, magnetic recording mediums having high magnetic density and high durability are greatly demanded. However, conventional magnetic recording mediums of the type in which a magnetic recording layer is merely formed on a non-magnetic support cannot satisfy the recent demand. Accordingly, there have been proposed magnetic recording mediums which comprise an intermediate or undercoat layer between the magnetic recording layer and the support. The intermediate layer is made, for example, of phenolic resins, epoxy resins, polyester resins, or mixtures thereof.

However, these intermediate layers made of resins alone are not satisfactory in view of the surface characteristics of the magnetic recording layer and the adhesion to the support. With regard to the adhesion, it was found that the undercoat layer had to have an appropriate degree of solubility in a magnetic paint used to form the magnetic layer. For instance, when an undercoat layer is readily soluble in a magnetic paint and has a thickness as small as about 0.1 μm or below, the layer is dissolved by means of a magnetic paint and disappears. On the contrary, when the undercoat layer has a thickness over 1 μm, it is partially dissolved in a magnetic paint, thus causing the resulting magnetic layer to be irregular on the surface thereof. In addition, as the undercoat layer increases in thickness, the thickness of the magnetic layer or non-magnetic support should be decreased. This will produce a number of problems in practical applications.

If the undercoat layer was completely insoluble in a magnetic paint, it could not be expected to improve adhesion of the magnetic layer. Thus, it becomes meaningless to provide the undercoat layer.

When an undercoat layer made only of a resin such as a phenolic resin is formed between the magnetic layer and the non-magnetic support, chargeability on the surface of the magnetic layer increases because the surface electric resistance of the undercoat layer is as high as $1 \times 10^{11}$ ohms/square, thus lowering the travelling performance of the resulting medium.

In order to overcome the above disadvantage, U.S. Pat. No. 4,275,113 describes a magnetic recording medium which comprises an intermediate layer of carbon black dispersed in a resin binder. However, this medium requires large amounts of carbon black in order to lower the surface electric resistance sufficiently, and peeling strength of the intermediate layer is relatively low, which presents a problem on durability of the medium.

SUMMARY OF THE INVENTION

It is an object of the present invention to provide a magnetic recording medium which comprises an undercoat layer composed of a combination of a thermosetting polyurethane resin, carbon black and an ammonium salt of a phosphoric ester whereby the medium has well-balanced characteristic properties including surface electric resistance, peeling strength and light transmittance.

It is another object of the invention to provide a magnetic recording medium which has better magnetic characteristics than prior art magnetic recording mediums because the undercoat layer permits a higher packing density of magnetic particles in a magnetic recording layer than in prior art magnetic recording mediums.

The present invention is characterized in that an undercoat layer, which is provided between a non-magnetic support and a magnetic recording medium, is made of a composition which comprises 100 parts by weight of a thermosetting polyurethane resin, 2 to 10 parts by weight of carbon black, and 1 to 10 parts by weight of an ammonium salt of a phosphoric ester of the following formula

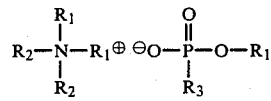

in which each $R_1$, each $R_2$ and $R_3$ independently represent an alkyl group having from 1 to 18 carbon atoms, an alkoxy group having from 1 to 4 carbon atoms, or a phenyl group. Preferably, in the formula, each $R_1$ represents $CH_3$, each $R_2$ represents an alkyl group having from 1 to 14 carbon atoms, and $R_3$ represents $-OCH_3$ or a phenyl radical. The undercoat composition may further comprise up to 10 wt %, preferably from 3 to 7 wt %, based on the total of the resins, of a thermosetting polyester resin.

DETAILED DESCRIPTION AND EMBODIMENTS OF THE INVENTION

Thermosetting polyurethane resins useful in the present invention may be any polyurethane resins ordinarily used in the magnetic recording art. The polyurethane resins should preferably have a larger number of urethane bonds, a softening point of 80° C. or over, and a molecular weight of from 10,000 to 100,000. Specific and preferable examples of the polyurethane resin include, for example, reaction products of alkylene adipate-base polyols such as ethylene adipate, propylene adipate, butylene adipate, hexylene adipate and the like, butylene glycol and diisocyanates such as diphenylmethane-4,4′-diisocyanate. Most preferably, a reaction product of butylene adipate polyol, butylene glycol and a diisocyanate is used. This type of polyurethane resin is commercially available under the designations of, for example, P-22S and P-26S from Nippon Polyurethane Co., Ltd. The polyurethane resins are readily cured, using an isocyanate curing agent, under conditions of a temperature of 30° to 80° C. and a time of 10 to 100 hours. Once cured, the resin layer formed on a non-magnetic support exhibits such an appropriate degree of solubility in organic solvents ordinarily used in magnetic paints that only the surface of the layer is dissolved in the solvent. Examples of the solvent include toluene, ketones such as methyl ethyl ketone, methyl isobutyl ketone, esters such as ethyl acetate, amides such as dimethylformamide, dioxane and the like. This permits strong adhesion between the undercoat layer and the magnetic layer formed from the magnetic paint, leading to a remarkable improvement in durability of the magnetic layer.

In the practice of the invention, carbon black and an ammonium salt of a phosphoric ester are dispersed throughout a thermosetting polyurethane resin. The carbon black may be any commercially available carbon black. However, in order to obtain a magnetic recording medium having well-balanced characteristic properties including surface electric resistance and peeling strength, and low light transmittance, the carbon black should preferably have a surface area of 100 to 400 $m^2/g$, an oil absorption of 50 to 200 ml/100g, and an average particle size of 10 to 40 m$\mu$.

Once again, the ammonium salt of a phosphoric ester has the following general formula

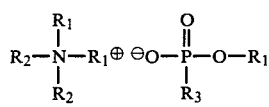

in which each $R_1$, each $R_2$ and $R_3$ independently represent an alkyl group having from 1 to 18 carbon atoms, an alkoxy group having from 1 to 4 carbon atoms, or a phenyl group. Preferably, in the formula, each $R_1$ represents $CH_3$, each $R_2$ represents an alkyl group having from 1 to 14 carbon atoms, and $R_3$ represents $—OCH_3$ or a phenyl radical. Typical examples of the ammonium phosphoric esters useful in the present invention are: (1) $C_{14}H_{29}(CH_3)_3N \oplus \ominus O_2P(OCH_3)_2$, (2) $C_{14}H_{29}(CH_3)_3N \oplus \ominus O_2P(C_6H_5)OCH_3$, and (3) $(C_{12}H_{25})_2(CH_3)_2N \oplus \ominus O_2P(OCH_3)_2$. The ammonium phosphoric ester of the formula is very effective in improving adhesion of the magnetic layer to a non-magnetic support through the undercoat layer and also electric conductivity even though carbon black is used only in small amounts. Because carbon black and the ammonium phosphoric ester are used in combination, the amount of carbon black is as small as from 2 to 10 parts by weight, preferably from 3 to 7 parts by weight, per 100 parts of the resin. The amount of the ammonium salt is from 1 to 10 parts by weight, preferably from 3 to 7 parts by weight, per 100 parts by weight of the resin. The synergistic effects of carbon black and the ester on the characteristic properties involve a considerable lowering of surface electric resistance and a much improved adhesion strength of the magnetic layer.

The combination of a thermosetting polyurethane resin, carbon black and an ammonium salt of a phosphoric ester is particularly advantageous in that the undercoat layer derived from the combination can be formed in a dry thickness as small as about 0.1 to 0.5 $\mu$m.

The undercoat layer may be readily formed on a non-magnetic support by any known coating techniques. A thermosetting polyurethane resin is first dissolved in a solvent having high dissolving power, e.g. cyclohexanone, tetrahydrofuran or the like, in a concentration as low as 5 wt % or below, along with predetermined amounts of carbon black and an ammonium salt of a phosphoric ester being dispersed therein. The resulting dispersion is applied onto a non-magnetic support in a dry thickness of from 0.1 to 0.5 $\mu$m and cured at a temperature of 30° to 80° C. for 10 to 100 hours. The polyurethane may be cured by itself but a curing agent such as an isocyanate may be used to facilitate the curing. Typical isocyanates serving as the curing agent may include those compounds of the following formulae (1) through (3)

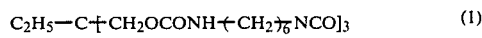

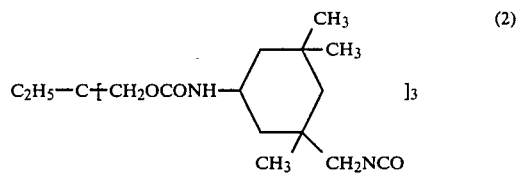

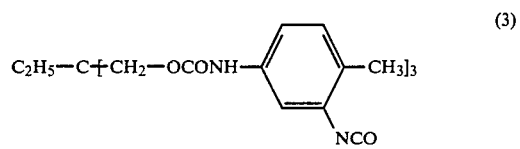

After curing of the undercoat layer, a magnetic paint is applied as usual. As is well known, the magnetic paint is a dispersion of magnetic particles in a dissolved binder. Magnetic particles are not critical and may be any particles used for these purposes. Mentioned as the particles are those particles of ferromagnetic metal oxides such as gamma-$Fe_2O_3$ and $Fe_3O_4$ with or without additional metals, ferromagnetic metals such as Fe, Co, Ni and alloys thereof. Other ferromagnetic materials may also be used without limitation. Resin binders may be either thermoplastic or thermosetting. These resin binders are well known in the art and are not discussed herein.

Solvents used in the magnetic paint may, more or less, vary depending on the type of resin binder, but ordinary used solvents such as toluene, ketones and mixtures thereof are preferred in the practice of the invention for the reason described before. The magnetic recording layer may be formed on the undercoat layer according to the usual practice.

In order to further improve the adhesion between a magnetic recording layer and the cured polyurethane resin layer, it is preferred to add a thermosetting polyester resin in an amount of 2 to 10 wt %, preferably from 3 to 7 wt %, of the total resin in the undercoat layer. The thermosetting polyester resin used for this purpose is a reaction product of terephthalic acid, isophthalic acid, and ethylene glycol and/or neopentyl glycol and is commercially sold, for example, under the designation of Vylon 200 from Toyobo Co., Ltd. The reason why the adhesion strength is improved by the addition of the polyester resin, is that once cured, the polyurethane resin is rather sparingly soluble in solvents, but the polyester resin is relatively soluble in solvents. In other words, the polyester serves to appropriately control the solubility of the undercoat layer in organic solvents, and a desired degree of solubility can be attained, resulting in an improvement of the adhesion strength.

The undercoat layer may further comprise stabilizers, and/or other additives, if necessary.

The present invention is more particularly described by way of examples and comparative examples.

EXAMPLE 1

One hundred parts by weight of a thermosetting polyurethane resin, P-26S, 20 parts by weight of an isocyanate curing agent, 5 parts by weight of a phosphoric ester antistatic agent of the formula (1) indicated before, and 5 parts by weight of carbon black having an average size of 20 mµ and a specific surface area, by BET, of 300 were dissolved and dispersed in a mixed solvent of 100 parts by weight of cyclohexanone and 1500 parts by weight of methyl ethyl ketone. The resulting dispersion was applied onto a 15 µm thick polyester base in a thickness of about 0.2 µm by the use of a gravure coater, followed by curing at 70° C. for 24 hours to form an undercoat layer.

Separately, 100 parts by weight of gamma-$Fe_2O_3$, 30 parts by weight of vinyl chloride/vinyl acetate resin, and 4 parts by weight of carbon black were dissolved and dispersed in a mixed solvent of 100 parts by weight of toluene and 100 parts by weight of methyl ethyl ketone by the use of a sand mill to obtain a magnetic paint. The magnetic paint was applied onto the undercoat layer in a thickness of 5 µm, dried, calendered, and cut to a predetermined width, thereby obtaining magnetic tapes.

COMPARATIVE EXAMPLE 1

The general procedure of Example 1 was repeated without use of any phosphoric ester antistatic agent but using carbon black in the undercoat layer in an amount of three times the amount used in Example 1, thereby obtaining magnetic tapes.

COMPARATIVE EXAMPLE 2

The general procedure of Example 1 was repeated without use of any phosphoric ester antistatic agent and carbon black in the undercoat layer, thereby obtaining magnetic tapes.

COMPARATIVE EXAMPLE 3

The general procedure of Example 1 was repeated except that no undercoat layer was formed, i.e. the magnetic paint was directly applied onto the polyester base, thereby obtaining magnetic tapes.

COMPARATIVE EXAMPLE 4

One hundred parts by weight of gamma-$Fe_2O_3$, 40 parts by weight of vinyl chloride/vinyl acetate resin, and 7 parts by weight of carbon black were dissolved and dispersed in a mixed solvent of 100 parts by weight of toluene and 100 parts by weight of methyl ehtyl ketone by the use of a sand mill for 10 hours. The resulting magnetic paint was applied onto a polyester base in a thickness of 5 µm, dried, calendered, and cut to a predetermined width, thereby obtaining magnetic tapes.

The magnetic tapes obtained in Example 1 and Comparative Examples 1 through 4 were subjected to performance tests to determine a maximum magnetic flux density, Bm, surface electric resistance, and peeling strength of the magnetic layer.

The peeling strength was determined as follows: an adhesive tape was attached to the magnetic layer surface of each magnetic tape while one end of the tape was kept free; the base film, laid horizontal, was drawn in a vertical direction at a rate of 1 cm/second; and the strength was determined as a force of separation between the base film and the magnetic layer.

The surface electric resistance was determined as follows: two rod-like metal electrodes, each having a section in the form of a quadrant, were kept apart at a distance of 12.7 mm; a magnetic tape was placed on the top of the respective electrodes so that the magnetic surface contacted the electrodes; weights of 160 g were suspended from the tape at opposite ends thereof; and a DC voltage of 500 plus or minus 50V was applied to the electrodes by the use of a megger to determine the surface electric resistance.

The results are shown in Table 1 below.

TABLE 1

| | Surface Electric Resistance (ohms/square) | Maximum Magnetic Flux Density (G) | Peeling Strength (gr.) |
|---|---|---|---|
| Example 1 | $3.0 \times 10^8$ | 1425 | 240 |
| Com. Ex. 1 | $2.8 \times 10^8$ | 1425 | 75 |
| Com. Ex. 2 | $2.6 \times 10^9$ | 1435 | 265 |
| Com. Ex. 3 | $3.0 \times 10^9$ | 1410 | 55 |
| Com. Ex. 4 | $4.3 \times 10^8$ | 1130 | 70 |

The tape of Comparative Example 4 is of the type which is now commercially sold. When compared with the tape of Comparative Example 4, the contents of carbon black and the binder in the magnetic layer can be relatively reduced. This permits packing of the magnetic powder in high density and thus the magnetic characteristics of the medium can be improved to an extent.

Although the amount of the binder in the magnetic layer is small, the peeling strength is much higher than the strength of the tape of Comparative Example 4 and is comparable to the strength of the tape of Comparative Example 2 in which the polyurethane alone is used as the undercoat layer. In addition, the surface resistance is small although the amount of carbon black is small. This results in high durability of the magnetic layer, ensuring good travelling performance of the medium. If the magnetic powder is merely packed in high density, the surface electric resistance becomes high as will be seen from the results of Comparative Examples 3 and 4, along with the disadvantage that the peeling strength lowers.

When the results of Example 1 are compared with the results of Comparative Example 1 in which a much greater amount of carbon black is used in the undercoat layer, the peeling strength is very low though the surface electric resistance is high. Thus, the undercoat layer composed of the combination of polyurethane, carbon black and an ammonium salt of phosphoric acid is remarkable. Example 2

The general procedure of Example 1 was repeated using, instead of 100 parts by weight of the P-26S polyurethane resin, a combination of 95 parts by weight of P-26S and 5 parts by weight of a thermosetting polyester resin, Vylon 200, thereby obtaining magnetic tapes. The tapes were subjected to performance tests in the same manner as in the foregoing example and comparative examples. The results are as follows: the surface electric resistance is $3.3 \times 10^9$ ohms/square, the maximum magnetic flux density is 1410 G, and the peeling strength is 270 g. As compared with the tape of Example 1, the peeling strength is improved because of the incorporation of the polyester resin though the electric and magnetic characteristics lower slightly.

What is claimed is:

1. In a magnetic recording medium which comprises a non-magnetic support, an undercoat layer formed on the support, and a magnetic recording layer formed on the undercoat layer, the improvement in that said undercoat layer is made of a compostion which comprises 100 parts by weight of a thermosetting polyurethane resin, 2 to 10 parts by weight of carbon black, and 1 to 10 parts by weight of an ammonium salt of a phosphoric ester of the following formula

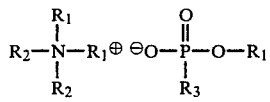

in which each $R_1$, each $R_2$ and $R_3$ independently represent an alkyl group having from 1 to 18 carbon atoms, an alkoxy group having from 1 to 4 carbon atoms, or a phenyl group.

2. A magnetic recording medium according to claim 1, wherein said polyurethane resin is a reaction product of an alkylene adipate polyol, butylene glycol and a diisocyanate.

3. A magnetic recording medium according to claim 2, wherein said polyurethane resin is a reaction product of butylene adipate polyol, butylene glycol and a diisocyanate.

4. A magnetic recording medium according to claim 1, wherein said carbon black has a surface area of 100 to 400 m$^2$/g, an oil absorption of 50 to 200 ml/100 g and an average size of 10 to 40 m$\mu$.

5. A magnetic recording medium according to claim 1, wherein said carbon black is used in an amount of 3 to 7 parts by weight.

6. A magnetic recording medium according to claim 1, wherein in the formula, each $R_1$ is $CH_3$, each $R_2$ is $CH_3$, $C_{12}H_{35}$ or $C_{14}H_{29}$, and $R_3$ is $OCH_3$ or a phenyl radical.

7. A magnetic recording medium according to claim 1, wherein said ammonium salt is used in an amount of 3 to 7 parts by weight.

8. A magnetic recording medium according to claim 1, wherein said undercoat layer is in a dry thickness of 0.1–0.5 $\mu$m.

9. A magnetic recording medium according to claim 1, wherein said composition further comprises up to 10 wt %, based on the total of the resins, of a thermosetting polyester resin.

10. A magnetic recording medium according to claim 9, wherein said thermosetting polyester resin is used in an amount of 3 to 7 wt % of the total of the resins.

* * * * *